US012114802B2

(12) United States Patent
Almagor (10) Patent No.: US 12,114,802 B2
(45) Date of Patent: Oct. 15, 2024

(54) STEAM AND HEATED LIQUID GENERATION METHOD AND SYSTEM FOR BEVERAGE SYSTEM

(71) Applicant: Omri Almagor, Milan (IT)

(72) Inventor: Omri Almagor, Milan (IT)

( * ) Notice: Subject to any disclaimer, the term of this patent is extended or adjusted under 35 U.S.C. 154(b) by 849 days.

(21) Appl. No.: 17/235,446

(22) Filed: Apr. 20, 2021

(65) Prior Publication Data

US 2022/0330743 A1    Oct. 20, 2022

(51) Int. Cl.
  *A47J 31/46*  (2006.01)
  *A47J 31/34*  (2006.01)
  *A47J 31/44*  (2006.01)
  *A47J 31/52*  (2006.01)
  *A47J 31/54*  (2006.01)

(52) U.S. Cl.
  CPC .............. *A47J 31/461* (2018.08); *A47J 31/34* (2013.01); *A47J 31/4489* (2013.01); *A47J 31/469* (2018.08); *A47J 31/5255* (2018.08); *A47J 31/54* (2013.01)

(58) Field of Classification Search
  CPC .... A47J 31/461; A47J 31/5255; A47J 31/469; A47J 31/34; A47J 31/4489; A47J 31/54
  See application file for complete search history.

(56) References Cited

U.S. PATENT DOCUMENTS

| 8,225,961 | B2 * | 7/2012 | Anson | A47J 31/469 |
| | | | | 222/14 |
| 2013/0055902 | A1 * | 3/2013 | Berto | F24H 15/219 |
| | | | | 392/397 |
| 2015/0064323 | A1 * | 3/2015 | Prefontaine | A47J 31/002 |
| | | | | 426/433 |
| 2016/0235246 | A1 * | 8/2016 | Beekman | F24H 1/08 |
| 2019/0380530 | A1 * | 12/2019 | Mueller | A47J 31/007 |
| 2020/0100619 | A1 * | 4/2020 | Reyhanloo | A47J 31/461 |

* cited by examiner

*Primary Examiner* — Nathaniel E Wiehe
*Assistant Examiner* — Keith Brian Assante
(74) *Attorney, Agent, or Firm* — Merle W Richman, III (57) ABSTRACT

Embodiments of improved generation of steam and heated liquids in a beverage system via the use of different pathways through liquid processing modules to process liquid to different, desired states are disclosed. Other embodiments may be described and claimed.

20 Claims, 11 Drawing Sheets

STEAM AND HEATED LIQUID GENERATION METHOD AND SYSTEM FOR BEVERAGE SYSTEM

TECHNICAL FIELD

Various embodiments described herein relate generally to beverage systems that generate or employ steam and heated liquids.

BACKGROUND INFORMATION

It may be desirable to provide improve the generation of steam and heated liquids in a beverage system.

DETAILED DESCRIPTION

In a beverage generation system, liquid such as water may be used in part to generate a desired beverage. In such a system, the liquid may be heated to different temperatures or achieve different states (gaseous such as steam (water vapor)) and pressures. The beverage system may for example heat and pressurize water to extract espresso from ground coffee beans in an embodiment. The beverage system may also generate steam to process another liquid (such as milk (lactose, soy, or nut based for example) to produce frothed milk.

Beverage systems may receive or have water (or other liquid) at an ambient temperature that may be desirably heated, pressurized to different states for use in beverage processing or generation. Such beverage systems may desirably generate or process water to a desired state quickly and using standard outlet power sources (limited wattage or amperage). Due to limited standard outlet power or amperage, a beverage system may employ two or more liquid processing modules to change the state of a liquid to a desired or needed state. Where the system is generating liquid with different desired states, a different processing pathway with multiple liquid processing modules may be required for each desired liquid state (such as steam or heated water). To reduce the number of needed liquid processing modules, a beverage system 100A-C as shown in FIGS. 1A-3F may use different pathways through the liquid processing modules to process liquid to different, desired states.

Figure 1A:
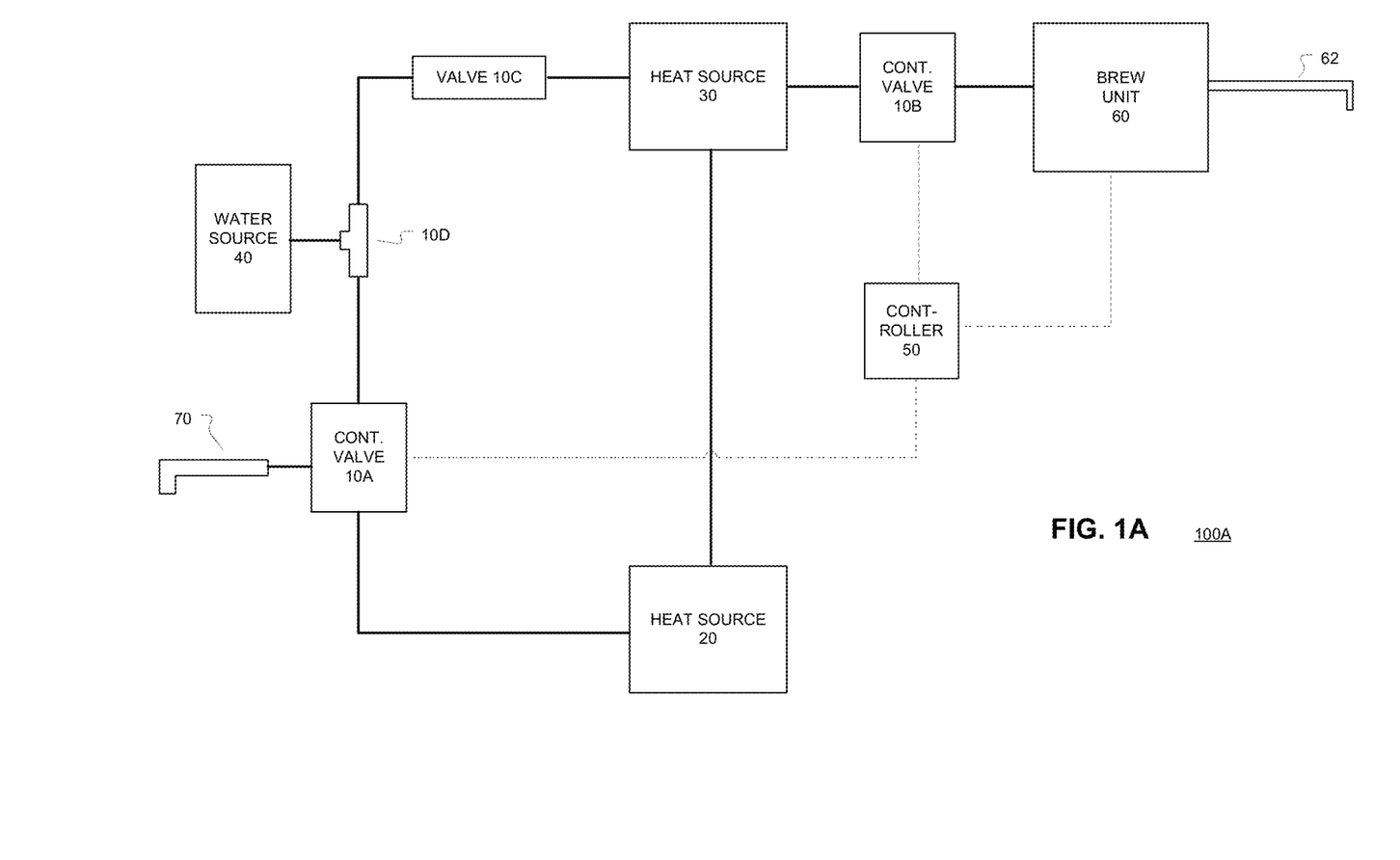
FIG. 1A is a simplified diagram of a beverage system with improved steam and heated liquid generation employing multiple liquid heating flow paths according to various embodiments.

FIG. 1A is a simplified diagram of a beverage system 100A with improved steam and heated liquid generation employing multiple liquid heating-processing flow paths according to various embodiments. As shown in FIG. 1A, the system 100A may include a liquid source 40, several valves or connectors 10A-D, a first liquid processing module 20, a second liquid processing module 30, a first processed liquid employment module 60, a second processed liquid employment module or device 70, and a controller 50.

In an embodiment, the first liquid processing module 20 may be a heat source or a module such as a flow-through heater or thermoblock that heats provided liquid, hereinafter referred to a heat source 20. The heat source 20 may generally desirably heat lower volume of liquids to higher temperatures. In an embodiment, the second liquid processing module 30 may also be a heat source or a module such as a boiler that heats provided liquid, hereinafter referred to a heat source 30. The heat source 30 may generally desirably heat higher volume of liquids to lower temperatures than the heat source 20. In an embodiment, the first processed liquid employment module 60 may be a brew unit 60 that may use provided heated, higher volume liquid to process a substance to produce a beverage such as processing coffee beans to produce coffee or espresso, referred hereinafter as a brew unit 60. As shown in FIG. 1A, the brew unit 60 may include a nozzle 62 that expels the produced beverage. In an embodiment, the second processed liquid employment module or device 70 may be a steam processing module or device such a steam wand or a steam system that employs lower volume, higher temperature liquid-steam to process another liquid such as milk, referred hereinafter as a steam processing system 70.

Figures 1B, 2A:
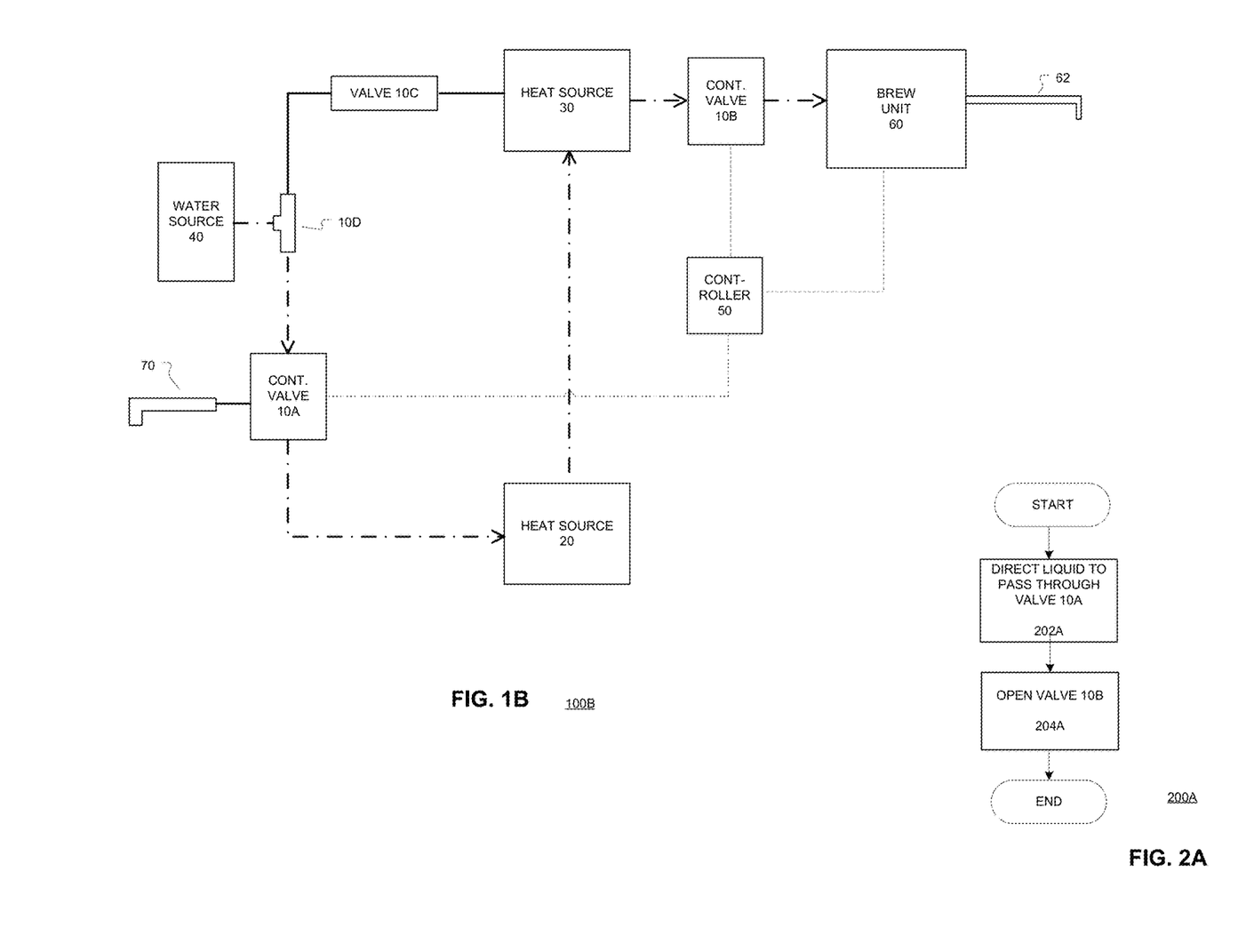
FIG. 1B is a simplified diagram of the beverage system shown in FIG. 1A being employed to generate heated liquid for a brew unit via a first flow path according to various embodiments.
FIG. 2A is a diagram of an improved algorithm for employing the beverage system shown in FIG. 1A to generate heated liquid for a brew unit via a first flow path according to various embodiments.
Figures 1C, 2B:
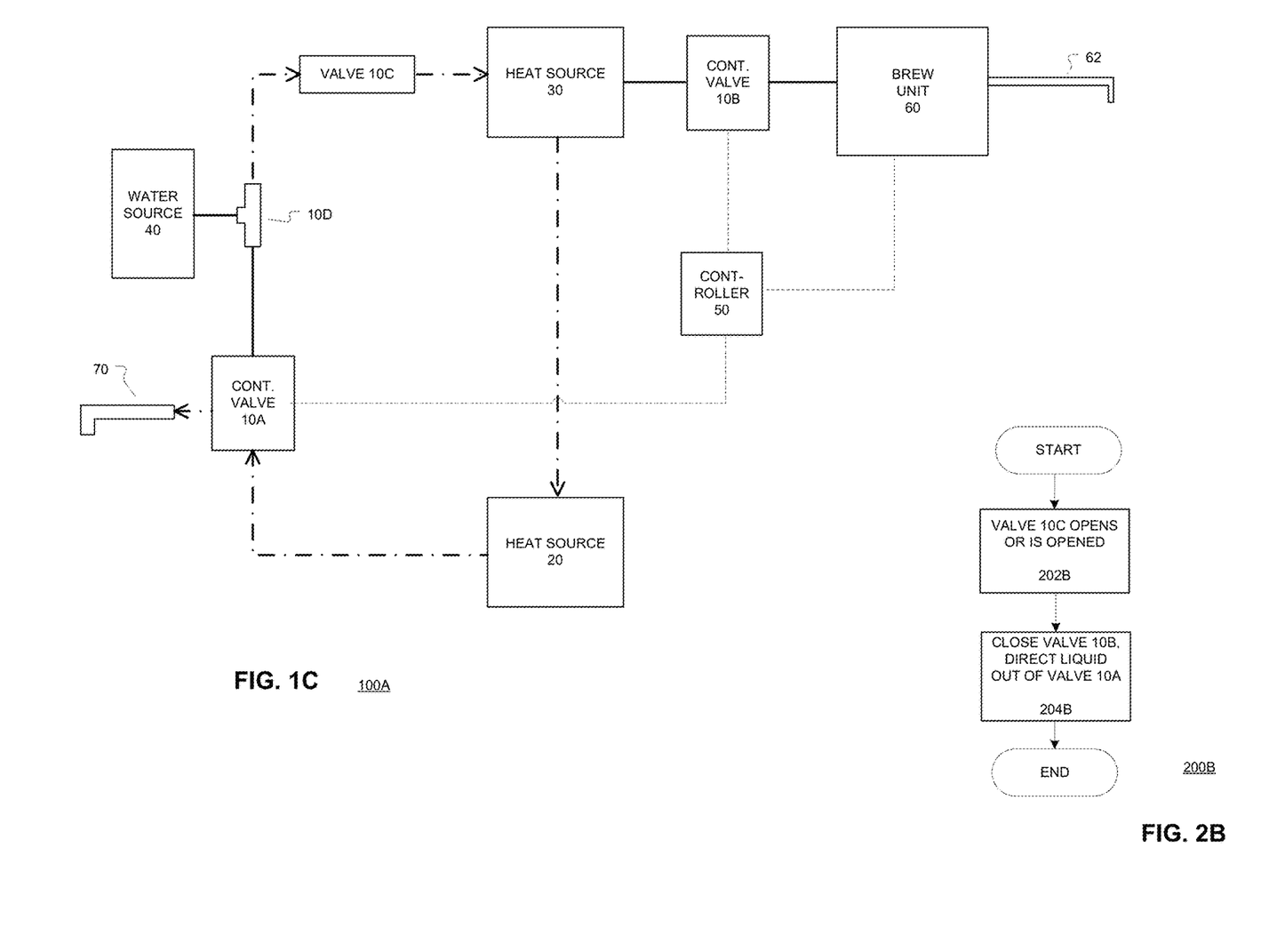
FIG. 1C is a simplified diagram of the beverage system shown in FIG. 1A being employed to generate steam via a second flow path according to various embodiments.
FIG. 2B is a diagram of an improved algorithm for employing the beverage system shown in FIG. 1A to generate steam unit via a second flow path according to various embodiments.

FIG. 1B is a simplified diagram of the beverage system 100A shown in FIG. 1A being employed and FIG. 2A is a diagram of an algorithm 200A for employing the beverage system shown in FIG. 1A to generate heated liquid for the brew unit 60 via a first flow path according to various embodiments. FIG. 1C is a simplified diagram of the beverage system 100A shown in FIG. 1A being employed and FIG. 2B is a diagram of an algorithm 200B for employing the beverage system shown in FIG. 1A to generate or provide steam to a steam processing module 70 via a second flow path according to various embodiments.

In an embodiment, the controller 50 may perform the algorithms 200A-B shown in FIGS. 2A-B to direct the operation of the system 100A between the first and second flow paths in an embodiment. The controller 50 may be coupled to two, controllable valves 10A, 10B. Referring to FIGS. 1B and 2A, the controller 50 may direct valve 10A to be open or pass liquid therethrough and valve 10B to be open (activities 202A, 204A), so liquid from the source 40 flows first into the heat source 20 for initial heating and then into heat source 30 for additional heating prior to entering the brew unit 60. As noted, when generating liquid for module 60, a greater volume of liquid may be directed to flow. The greater liquid volume may only enable the heat source 20 to raise the liquid to a first temperature level, less or lower than it would normally for a lower volume of liquid. In an embodiment, the controller 50 may also be coupled to the brew unit 60 to control its operation as liquid is flowing from the first flow path via the control valve 10B into the brew unit 60.

In an embodiment, the valve 10C may be closed unless pressure exceeds a certain level, such as 3 Bars in an embodiment. In an embodiment, the source 40 may provide pressured liquid but since valve 10A is open or allowing liquid to pass therethrough, sufficient pressure will not reach valve 10C to cause it to open. In an embodiment, the valve 10C may also be controllable and be closed during the first flow path shown in FIG. 1B and be open in the second flow path shown in FIG. 1C.

Referring to FIGS. 1C and 2B, the controller 50 may direct valve 10A to be closed or direct liquid out of the valve (open to steam processing system 70) and valve 10B to be closed (activities 202B, 204B), so liquid from the source 40 flows first into the heat source 30 for initial heating into steam after sufficient pressure is reached at valve 10C in an embodiment. As noted, a lower volume of liquid may be directed to flow when generating steam. Thereby, the heat source 30 may be able to heat received liquid to a higher temperature due to the reduced volume. As explained below, the heat source 30 may also be configured to more easily generate steam for a lower volume of liquid or for liquid received from a different pathway than when generating heated liquid for module 60.

Then the steam from heat source 30 may flow into heat source 20 for additional heating—creating dryer steam in an embodiment prior to being passed to the steam processing system 70 via valve 10A. In an embodiment, the controller 50 may also be coupled to the heat sources 20, 30 and direct the heat source 30 to operate at a higher temperature to generate steam from received liquid in second flow path. In an embodiment, due to the pressure constraints for valve 10C, less volume of liquid may be processed by heat source 30 so it is heated to a higher temperature via the second flow path shown in FIG. 1.

Figure 1D:
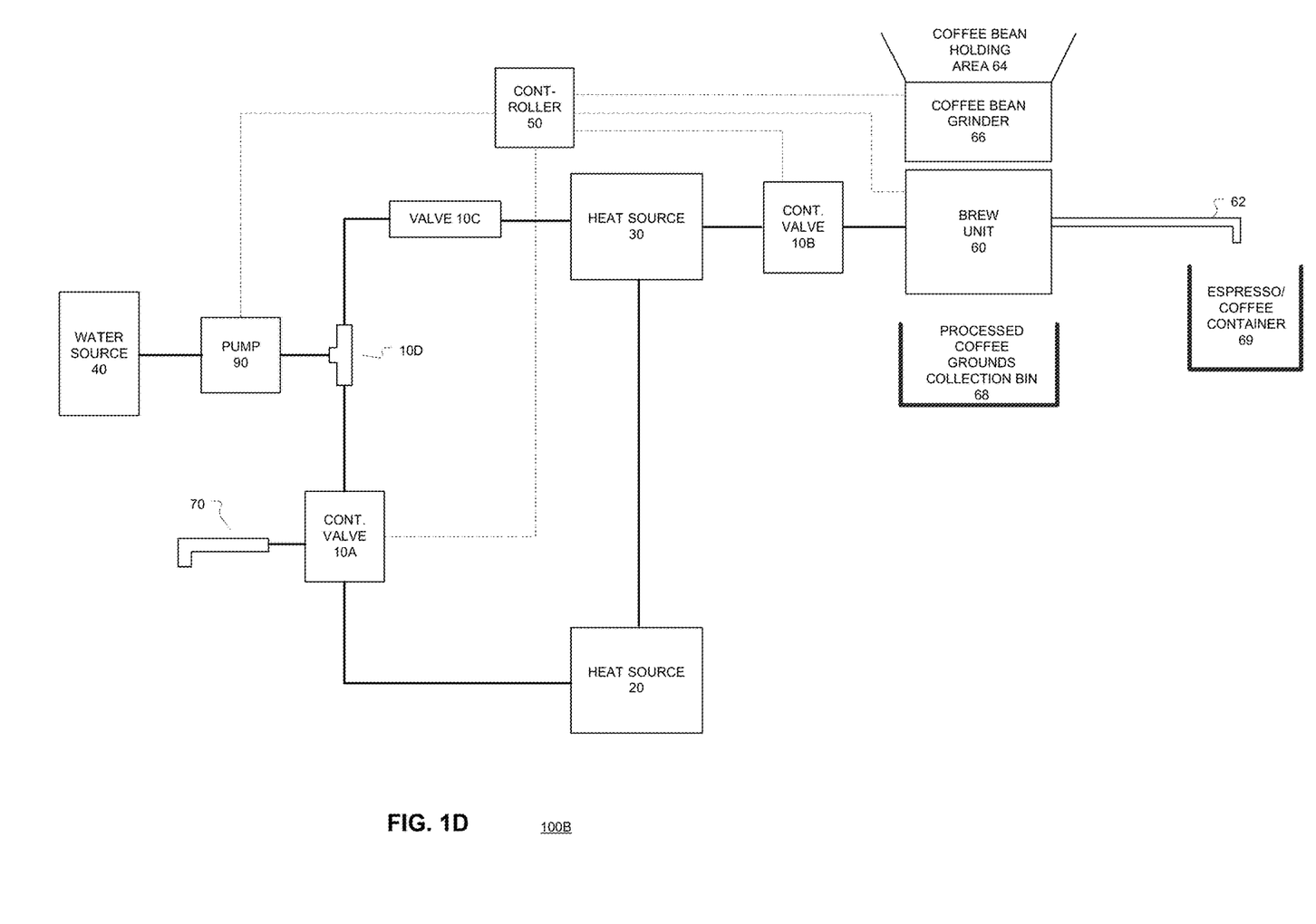
FIG. 1D is a simplified diagram of an automatic brewing system with improved steam and heated liquid generation employing multiple liquid heating flow paths according to various embodiments.

FIG. 1D is a simplified diagram of another beverage system 100B with improved steam and heated liquid generation employing multiple liquid heating flow paths according to various embodiments. System 100B is similar to system 100A but may be a complete automatic espresso generation machine. System 100B may further include a pump 90, coffee bean hopper or holding area 64, coffee bean grinder 68, processed coffee grounds collection bin 68, and an espresso/coffee container 69. The controller 50 may be further coupled to the pump 90 and coffee bean grinder 66. The controller 50 direct the pump 90 to provide liquid at desired pressures. The controller 50 may also direct the coffee bean grinder to process a desired amount of beans for use by the brew unit 60.

Figure 3A:
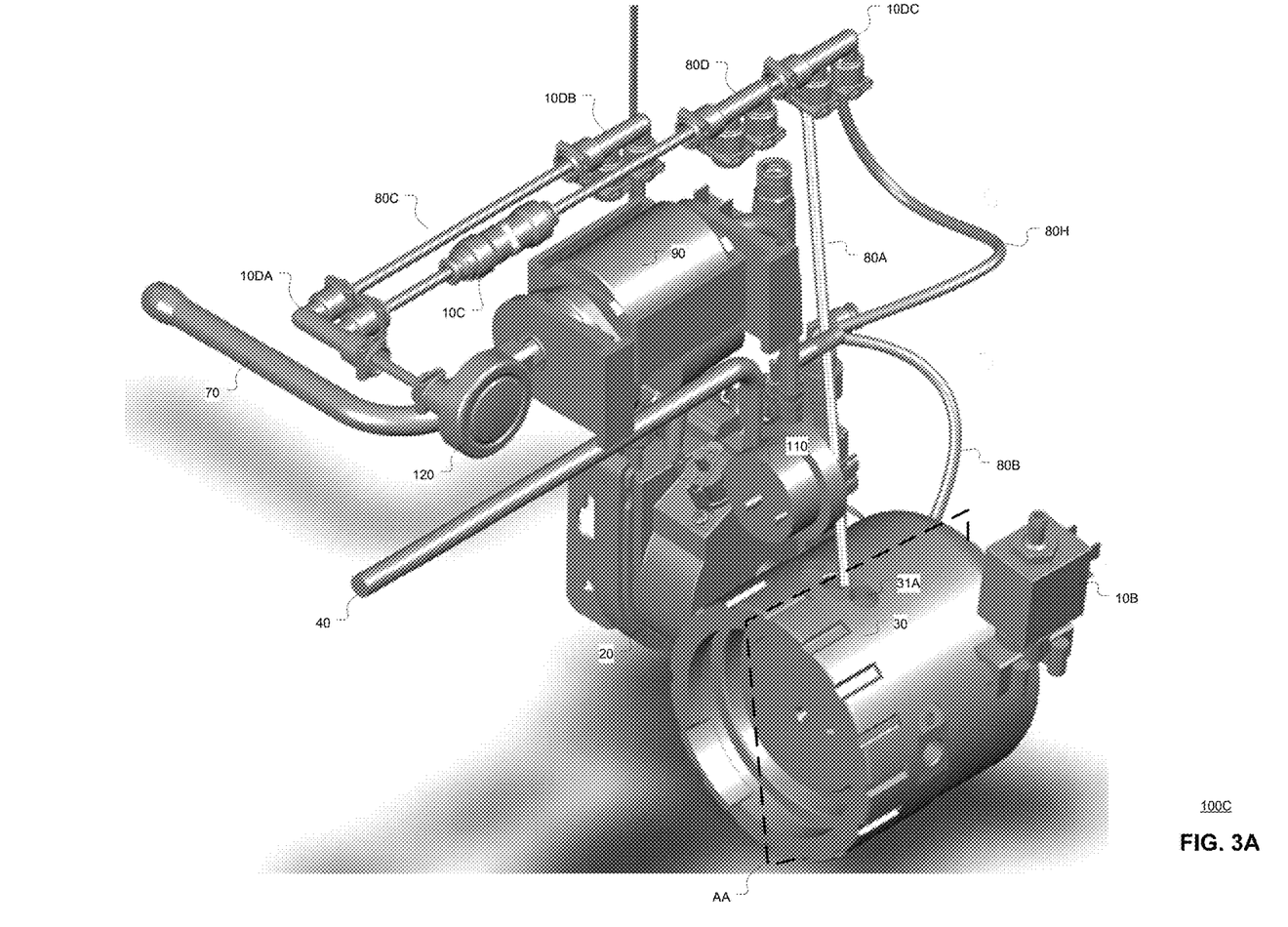
FIG. 3A is a simplified isometric partial drawing of a beverage system with improved steam and heated liquid generation employing multiple liquid heating flow paths according to various embodiments.
Figure 3B:
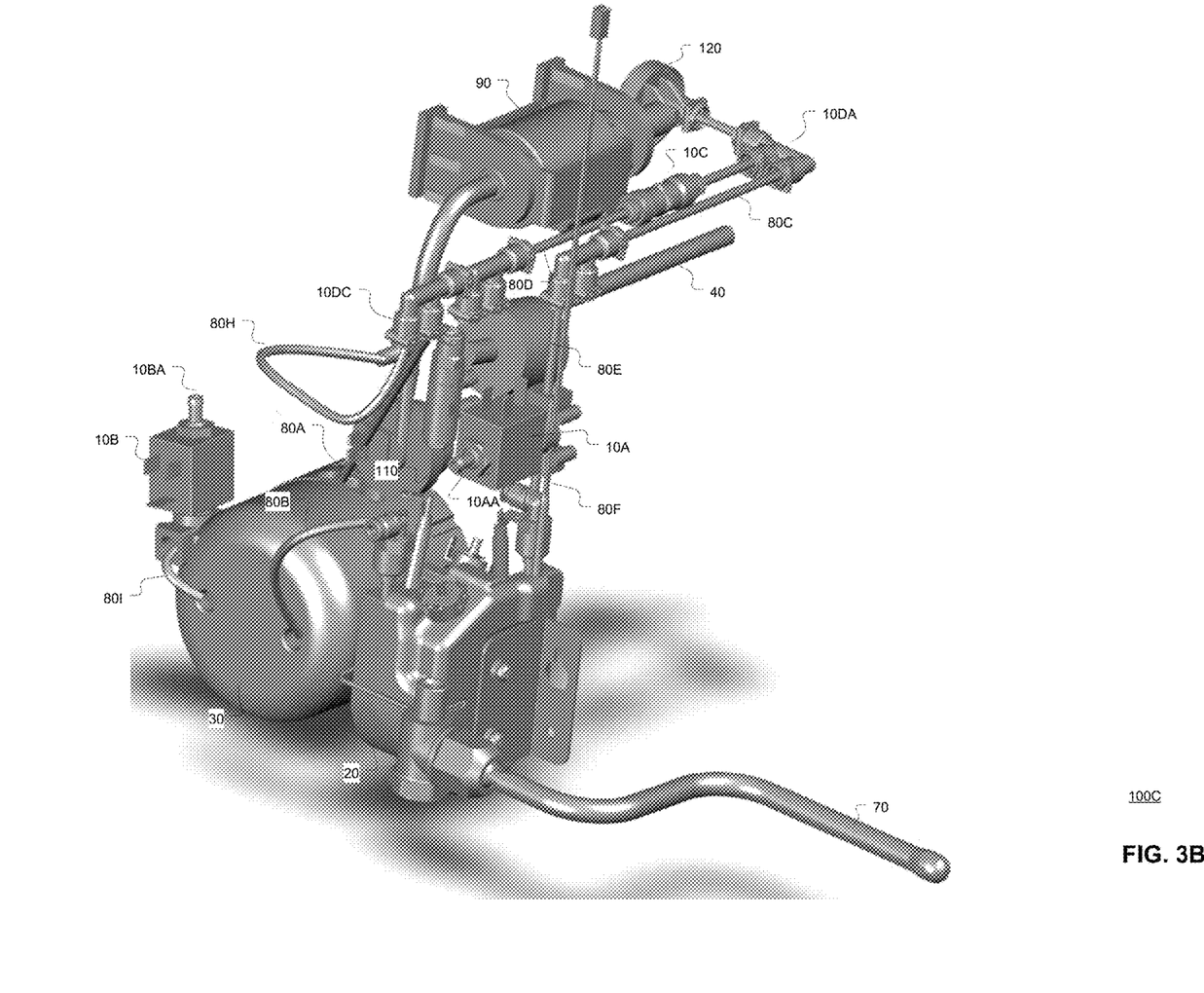
FIG. 3B is an isometric, rear view of the system shown in FIG. 3A according to various embodiments.

FIG. 3A is a simplified isometric partial drawing of a beverage system 100C with improved steam and heated liquid generation employing multiple liquid heating flow paths according to various embodiments. FIG. 3B is an isometric, rear view of the system 100C shown in FIG. 3A according to various embodiments. Beverage system 100C is similar in concept to systems 100A-B. System 100C includes liquid source pipe 40 that is coupled via a flowmeter 110 to a pump 90. The output of the pump 90 passes through a pressure meter-regulator 120 into a three-way connector 10DA (similar to the three-way connector 10D shown in FIGS. 1B-1D). Valve 10C is similar valve 10C in FIGS. 1B-1D and does not pass liquid below a preset pressure.

For the first flow path to generate heated liquid for a brew unit 60 (not shown in FIGS. 3A-B but to be coupled to valve 10B), liquid from pump 90 may pass into pipe 80C and into pipe 80E via connector 10DB because valve 10AA (similar to valve 10A in FIG. 1B-1D) is open for the first flow path. Then liquid flows into the heat source (thermoblock in an embodiment) 20 via pipe 80F. The heated liquid then flows into the second heat source 30 via pipe 80B and to a brew unit via pipe 80I and controllable valve 10B (same as 10B in FIGS. 1B-D).

For the second flow path, the controllable valve 10AA would be closed, causing liquid to pass through valve 10C (once sufficient pressure is achieved) and into pipe 80A directly into heat source 30, which generates steam (as explained with reference to FIGS. 3C-3F) which is passed to pipe 80B into the heat source 20 for drying (in an embodiment) prior to being passed to a steam processing system 70 via pipe 80F and controllable valve 10A output 10AA (which is coupled to the steam processing system 70 (coupling not shown in FIG. 3B)).

Figure 3C:
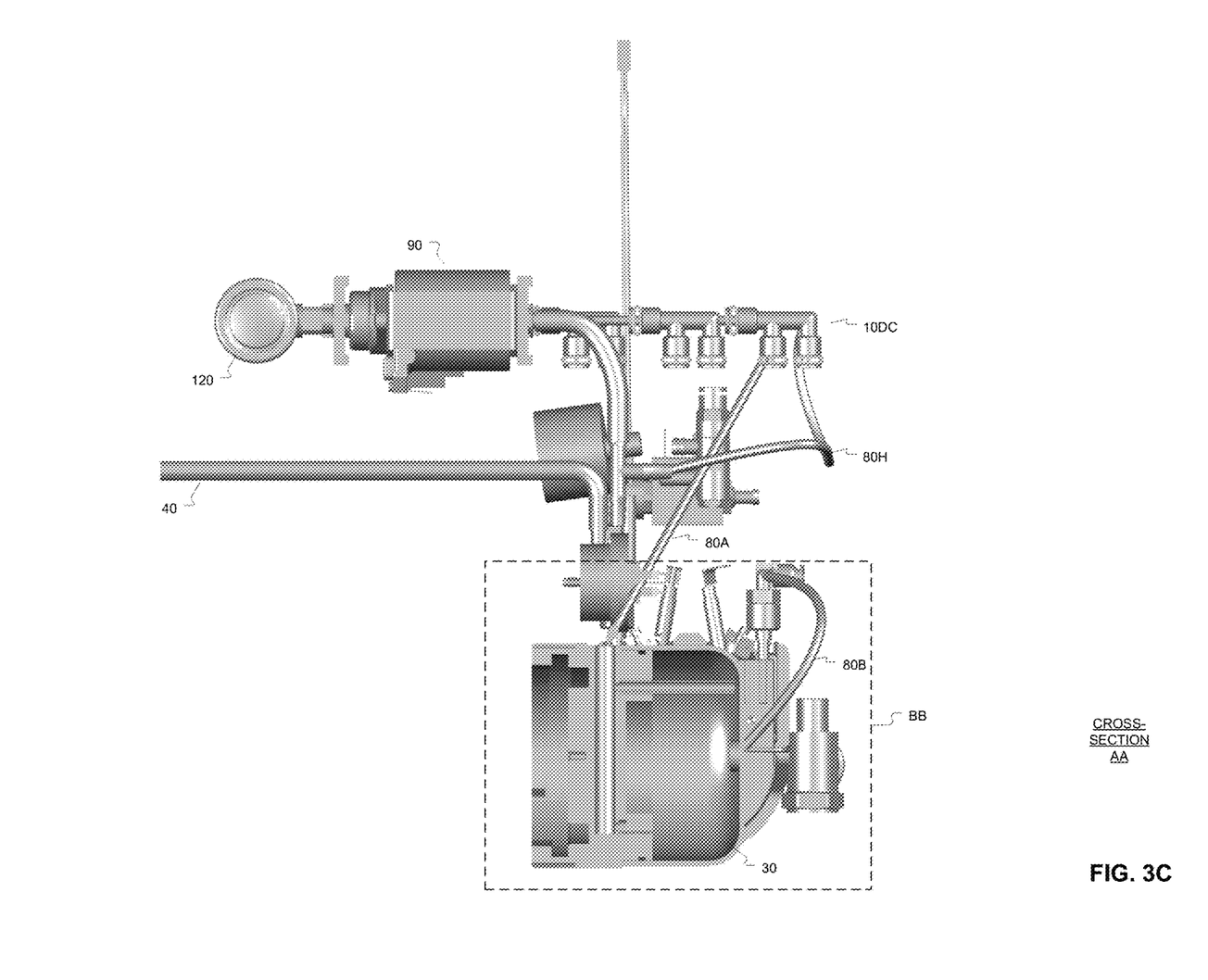
FIG. 3C is a simplified right-side view, cross-sectional drawing of the system shown in FIG. 3A across plane AA according to various embodiments.
Figure 3D:
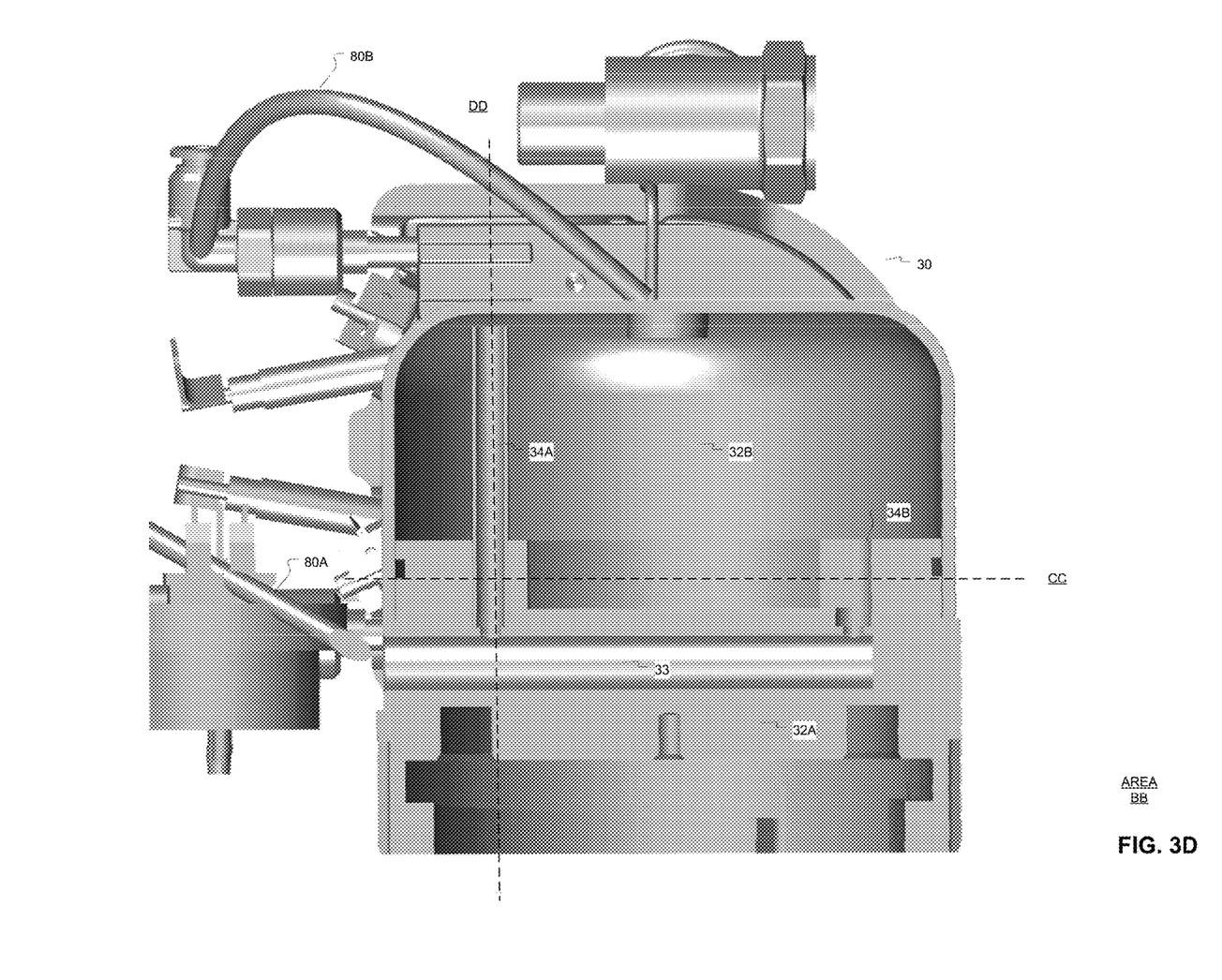
FIG. 3D is an enlarged, rotated view of area BB shown in FIG. 3C according to various embodiments.
Figure 3E:
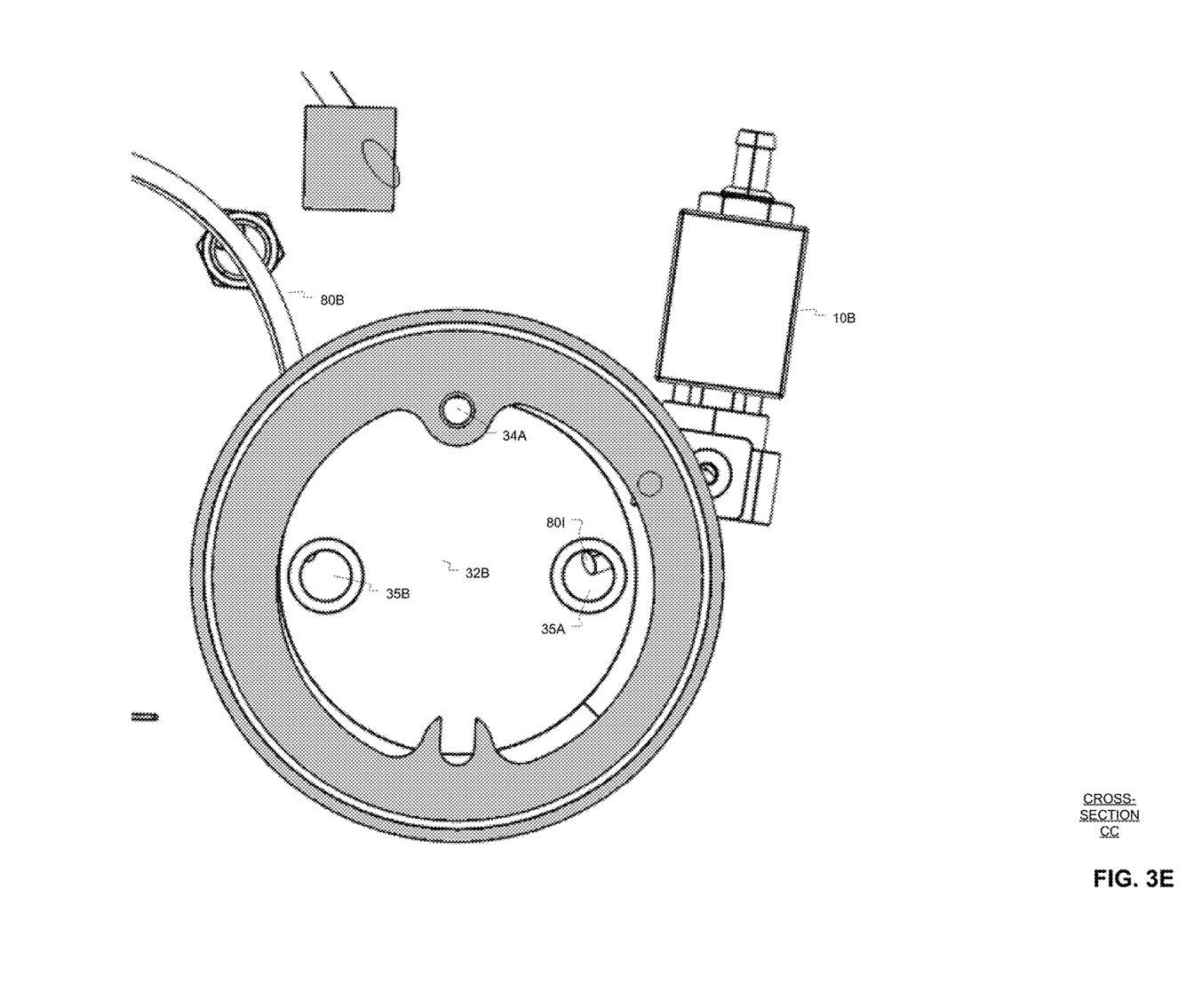
FIG. 3E is a cross sectional drawing of area BB along plane CC shown in FIG. 3D according to various embodiments.
Figure 3F:
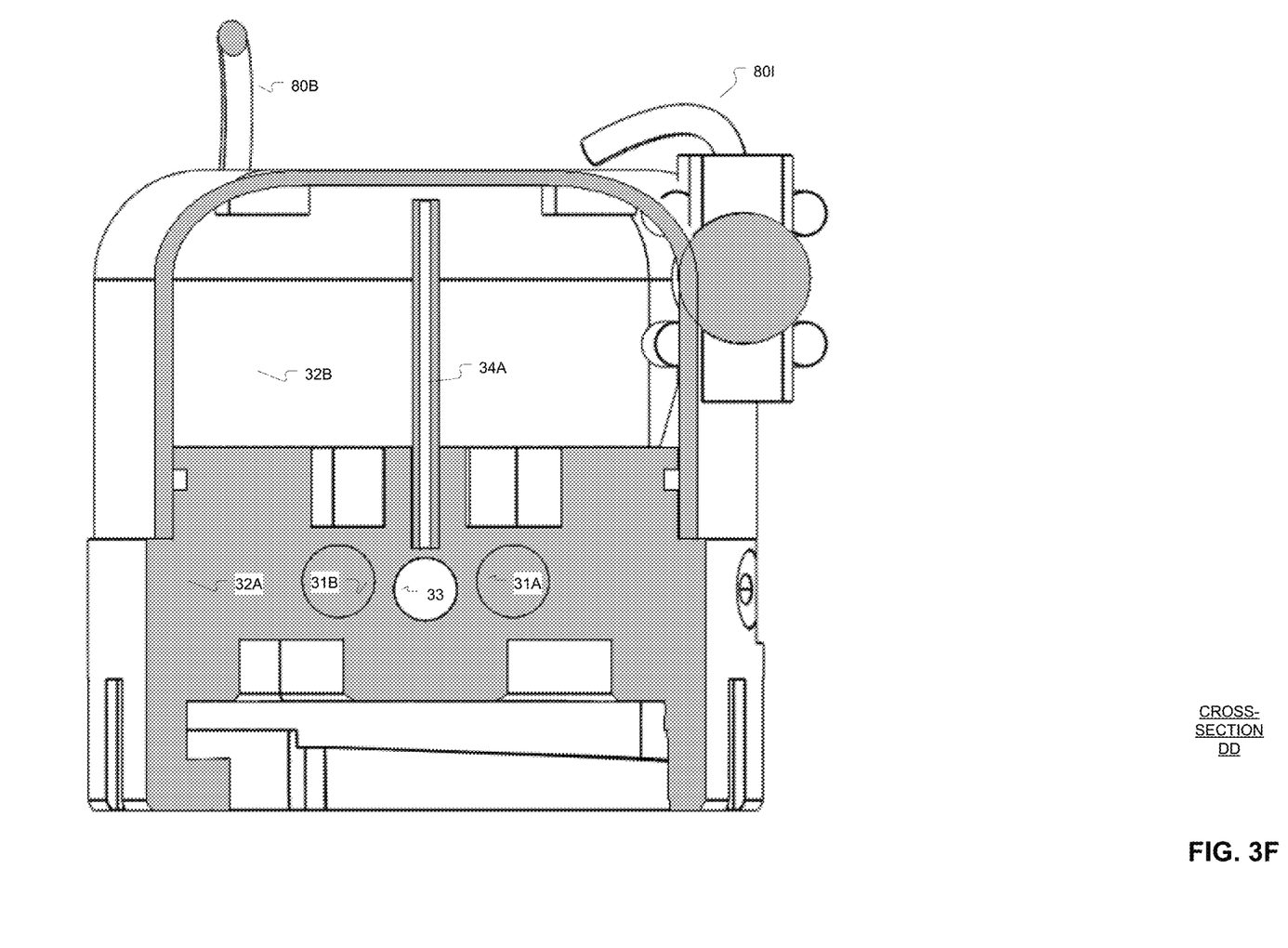
FIG. 3F is a cross sectional drawing of area BB along plane DD shown in FIG. 3D according to various embodiments.

FIGS. 3C-3F are drawings of a heat source 30 that quickly generates steam when liquid enters the heat source 30 via the second path, i.e., via pipe 80A and exits as steam via pipe 80B to be further heated by the heat source 20. FIG. 3C is a simplified right-side view, cross-sectional drawing of the system 100C shown in FIG. 3A across plane AA according to various embodiments. FIG. 3D is an enlarged, rotated view of area BB, primarily the heat source 30 shown in FIG. 3C according to various embodiments. FIG. 3E is a cross sectional drawing of area BB along plane CC shown in FIG. 3D of the heat source 30 according to various embodiments. FIG. 3F is a cross sectional drawing of area BB along plane DD of heat source 30 shown in FIG. 3D according to various embodiments.

As shown in FIGS. 3C-3F, heat source 30 includes a lower or first solid metal or alloy section 32A (such as brass or stainless steel in an embodiment), an open upper or second section 32B. Within the lower section 32A, one or two elongated heating elements 31A, 31B may be placed on either side of a cylindrical inlet 33 that is coupled to the pipe 80A (see FIG. 3D). An elongated tube 34A is coupled to the inlet 33 and exits in the upper, second section 32B near the pipe 80B coupling opening 35B. A shorter pipe 34B may also be connected to the elongated inlet 33. When the system 100C is operating the second flow path mode, liquid is communicated into the inlet 33 via the pipe 80A. Due the adjacent heating elements 31A, 31B, the liquid generates steam that passes via pipe 34A to the pipe 80B via the opening 35B (FIG. 3E). When the system 100C is operating in an idle state, water, inlet 33 causes pressure and temperature to increase in cavity 32B via the pipes 34A, 34B. The pressure causes water to move or siphon between the pipes 34A, 34B until temperature and pressure equalize in the cavity 32B and inlet 33.

When the system 100C is operating in the first flow path mode, liquid enters into the upper, second section or chamber 32B via pipe 80B. It may flow through the tube 34A, 34B into inlet 33 but primarily stay within the upper section 32B prior to exiting via opening 35A into pipe 801 into controllable valve 10B for passage to a brew unit 60 in an embodiment. Liquid entering the heat source 30 via the first flow path (via pipe 80B) has already been heated by heat source 20.

Figure 4:
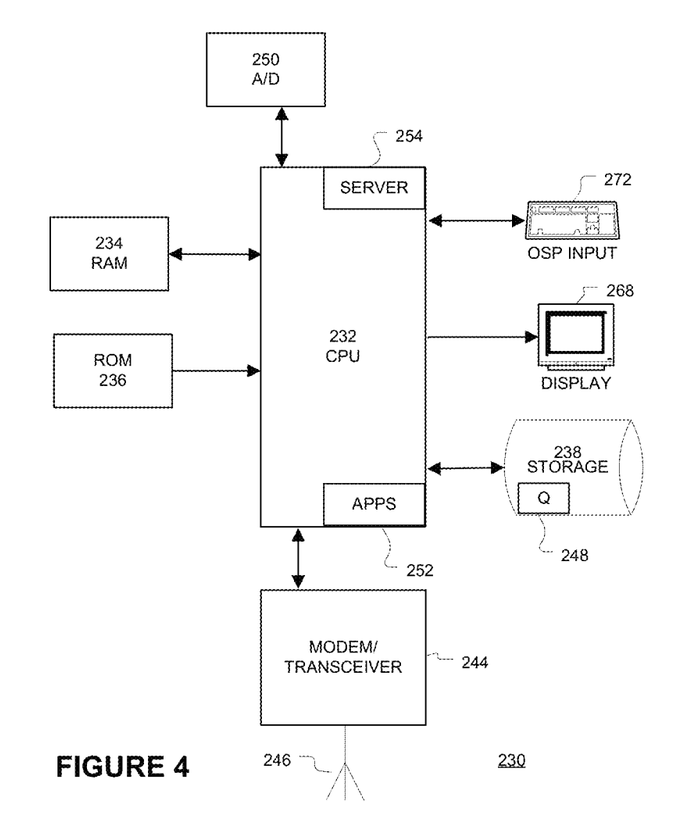
FIG. 4 is a block diagram of an article according to various embodiments.

FIG. 4 illustrates a block diagram of a device 230 that may be employed as a controller 10A in various embodiments to perform the algorithms 200A-C and communicate with a User device. The device 230 may include a CPU 232, a RAM 234, a ROM 236, a storage unit 238, a modem/transceiver 244, a digital to analog converter 250, an input module 272, display module 268, and an antenna 246. The CPU 232 may include a web-server 254 and application module 252. The RAM 234 may include a queue or database where the database may be used to store information. The storage 238 may also include a queue or database 248 where the database 248 may be used to store particle distribution requests and related processing requests in an embodiment. In an embodiment, the server 254 and the application module 252 may be separate elements. In an embodiment, the server 254 may generate content for web-pages or displays to be forwarded to a user to control the operation of a system 100A-D.

The user input device 272 may comprise an input device such as a keypad, touch screen, track ball or other similar input device that allows the user to navigate through menus, displays in order to operate systems 100A-C. The display 268 may be an output device such as a CRT, LCD, touch screen, or other similar screen display that enables the user to read, view, or hear received messages, displays, or pages from the system 100A-D.

The modem/transceiver 244 may couple, in a well-known manner, the device 230 to a user device to enable communication with the CPU 232. In an embodiment, the modem/transceiver 244 may be a wireless modem or other communication device that may enable communication with a user device. The CPU 232 via the server 254 or application 252 resident on a user device may direct communication between modem 244 and a user device.

The ROM 236 may store program instructions to be executed by the CPU 232, server 254, or application module 252. The RAM 234 may be used to store temporary program information, queues, databases, and overhead information. The storage device 238 may comprise any convenient form of data storage and may be used to store temporary program information, queues, databases, and overhead information.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. For example, the controller 50 may be simple switches that control valves 10A-C based on the position of one or more simple switches or toggles in an embodiment.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus, the following claims are hereby incorporated into the Detailed Description, with each claim standing on its own as a separate embodiment.

What is claimed is:

1. A beverage generation system including:
   a liquid source;
   a first liquid processing device (LPD) (20);
   a second LPD (30), a first processed liquid employment module (PLED) (60);
   a second PLED (70);
   wherein in a first mode of operation, liquid is passed from the liquid source (40) to the first LPD (20), then to the second LPD (30) from the first LPD (20), and then from the second LPD (30) to the first PLED (60), and
   wherein in a second, different mode of operation, liquid is passed from the liquid source (40) to the second LPD (30), then from the second LPD (30) the first LPD (20), and then from the first LPD (20) to the second PLED (70).

2. The beverage generation system according to claim 1, wherein the first LPD (20) is a heat source that heats received liquid and the second LPD (30) is a heat source that heats received liquid.

3. The beverage generation system according to claim 1, wherein in the first mode of operation, a greater volume is passed between the second LPD (30) and the first LPD (20) than in the second mode of operation.

4. The beverage generation system according to claim 3, wherein the first PLED (60) is a brew unit that employs received heated liquid to brew a beverage.

5. The beverage generation system according to claim 3, wherein the liquid processed by the system is water and the first PLED (60) is a brew unit that employs received heated liquid to process coffee beans to produce espresso.

6. The beverage generation system according to claim 1, wherein the liquid processed in the system is water.

7. The beverage generation system according to claim 1, wherein in the second, different mode of operation, liquid is passed from the liquid source (40) to the second LPD (30), then from the second LPD (30) the first LPD (20), and then from the first LPD (20) to the second PLED (70) in the form of steam.

8. The beverage generation system according to claim 7, wherein the second PLED (70) is a steam processing unit that employs received stream.

9. The beverage generation system according to claim 1, further including a first controllable valve (CV) (10A) coupled to the liquid source, the first LPD (20), and the second PLED (70) and controllable to either pass liquid between the liquid source (40) and the first LPD (20) or pass liquid between the first LPD (20) and the second PLED (70).

10. The beverage generation system according to claim 9, further including a second CV (10B) coupled to the second LPD (30) and the first PLED (60) to control the passage of liquid between the second LPD (30) and the first PLED (60).

11. The beverage generation system according to claim 10, further including a pressure regulated valve (10C) coupled to the liquid source (40) and the second LPD (30) and enabling liquid from the liquid source (40) to pass to the second LPD (30) when the pressure level of the liquid from the liquid source exceeds a predetermined level.

12. The beverage generation system according to claim 11, further including a pressure regulated valve (10C) coupled to the liquid source (40) and the second LPD (30) and enabling liquid from the liquid source (40) to pass to the second LPD (30) when the pressure level of the liquid from the liquid source exceeds a predetermined level.

13. The beverage generation system according to claim 12, further including a controller (50) electrically coupled to the first CV (10A) and the second CV (10B) to control their operation.

14. The beverage generation system according to claim 11, further including a third CV coupled to the liquid source (40) and the second LPD (30) and controlling the passage of liquid from the liquid source (40) to the second LPD (30).

15. The beverage generation system according to claim 14, further including a controller (50) electrically coupled to the first CV (10A), the second CV, and the third CV (10C) to control their operation.

16. A beverage generation system including:
a liquid source;
a first liquid processing device (LPD) (20);
a second LPD (30), the second LPD (30) coupled to the first LPD (20) enabling to pass there between;
a first processed liquid employment module (PLED) (60);
a second PLED (70);
a first controllable valve (CV) (10A) coupled to the liquid source, the first LPD (20), and the second PLED (70) and controllable to either pass liquid between the liquid source (40) and the first LPD (20) or pass liquid between the first LPD (20) and the second PLED (70);
a second CV (10B) coupled to the second LPD (30) and the first PLED (60) to control the passage of liquid between the second LPD (30) and the first PLED (60);
a pressure regulated valve (10C) coupled to the liquid source (40) and the second LPD (30) and enabling liquid from the liquid source (40) to pass to the second LPD (30) when the pressure level of the liquid from the liquid source exceeds a predetermined level; and
a controller (50) electrically coupled to the first CV (10A) and the second CV (10B) to control their operation, wherein in a first mode of operation, the controller (50) directs the first CV (10A) to pass liquid from the liquid source to the first LPD (20) and directs the second CV to pass liquid from the second LPD (30) to the first PLED (60), causing liquid to pass from the liquid source (40) to the first LPD (20) via the first CV (10A) then from the second LPD (30) from the first LPD (20), and then from the second LPD (30) to the first PLED (60) via the second CV (10B), and
wherein in a second, different mode of operation, the controller (50) directs the first CV (10A) to pass liquid from the first LPD (20) to the second PLED (70) and directs the second CV to not pass liquid from the second LPD (30) to the first PLED (60), causing liquid to pass from the liquid source (40) to the second LPD (30) via the pressure regulated valve (10C) then from the second LPD (30) the first LPD (20) and then from the first LPD (20) to the second PLED (70) via the first CV (10A).

17. The beverage generation system according to claim 16, wherein the first LPD (20) is a heat source that heats received liquid and the second LPD (30) is a heat source that heats received liquid.

18. The beverage generation system according to claim 17, wherein the first PLED (60) is a brew unit that employs received heated liquid to brew a beverage.

19. The beverage generation system according to claim 16, wherein in the second mode of operation, the second LPD (30) is a heat source that heats received liquid to a form of steam.

20. The beverage generation system according to claim 19, wherein the second PLED (70) is a steam processing unit that employs received stream.

* * * * *